Figure 1:
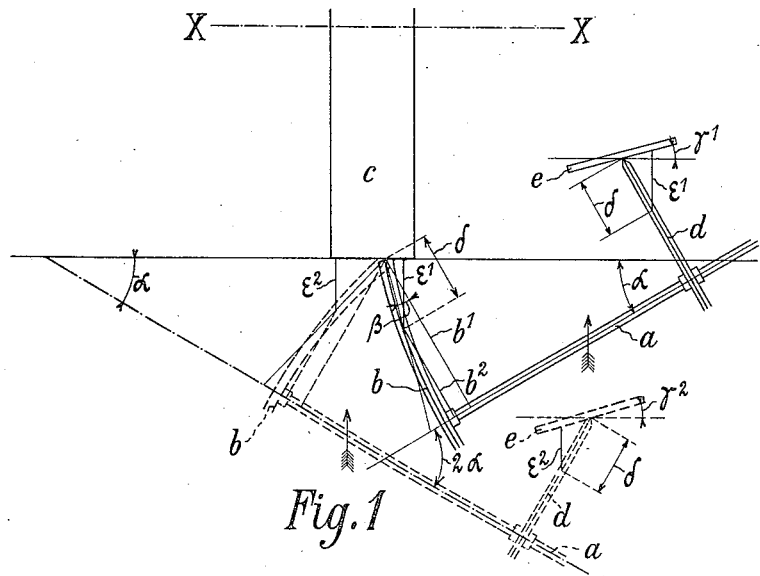

O. HENKER.
MACHINE FOR GRINDING BEVELED RIM SURFACES ON SPECTACLE GLASSES.
APPLICATION FILED AUG. 8, 1918.

1,422,055.  Patented July 4, 1922.

Inventor
Otto Henker

UNITED STATES PATENT OFFICE.

OTTO HENKER, OF JENA, GERMANY, ASSIGNOR TO THE FIRM OF CARL ZEISS, OF JENA, GERMANY.

MACHINE FOR GRINDING BEVELED RIM SURFACES ON SPECTACLE GLASSES.

1,422,055.             Specification of Letters Patent.       Patented July 4, 1922.

Application filed August 8, 1918. Serial No. 249,032.

(GRANTED UNDER THE PROVISIONS OF THE ACT OF MARCH 3, 1921, 41 STAT. L., 1313.)

*To all whom it may concern:*

Be it known that I, OTTO HENKER, a citizen of the German Empire, residing at Jena, Germany, have invented a new and useful Machine for Grinding Beveled Rim Surfaces on Spectacle Glasses, for which I have filed applications in Germany, May 5, 1917, Patent No. 326,635; England, Apr. 25, 1918, and Austria, May 1, 1918, and of which the following is a specification.

The present invention relates to a machine for grinding beveled rim surfaces on spectacle-glasses, in which the grinding of a rim surface is limited by a cam which is rotatable about an axis parallel to the axis of rotation of the spectacle-glass and by a stop coacting with the said cam, and more particularly to a machine of the above kind, which is adapted for grinding rim surfaces on spectacle-glasses, the sides of which are dissimilar and which are not circular. In order to be able to grind beveled rim surfaces on such spectacle-glasses with the well-known grinding machines, it is necessary, in order to limit the grinding by means of the cam and the stop coacting with it, to employ for each spectacle-glass of a given shape and size a cam having the curvature of its rim adapted not only to the shape and size of the said glass but also to the form of the refracting surfaces of the same. Thus for example for grinding a beveled rim surface on a meniscal spectacle-glass, when selecting the cam to be employed, the amount of the median curvature must also be taken into account. Now it is the object of the present invention so to arrange machines for grinding beveled rim surfaces on spectacle-glasses that for all glasses of a certain shape, for instance for all such glasses as have the shape of an ellipse of a certain definite size, one and the same cam may be used, quite irrespective of what amount of the median curvature the glass in question may have.

This object is attained according to the invention by the spectacle-glass and the grinding surface as well as the cam and the stop being displaced relatively to each other during the grinding process in a direction forming an angle with the shaft for holding the spectacle-glass, which angle differs from 90°, and additionally by disposing the parts to be displaced relatively to one another during the grinding process in such a manner that the angle contained by the stop for the cam and the direction of displacement of the parts to be displaced relatively to one another is variable.

Figure 2:
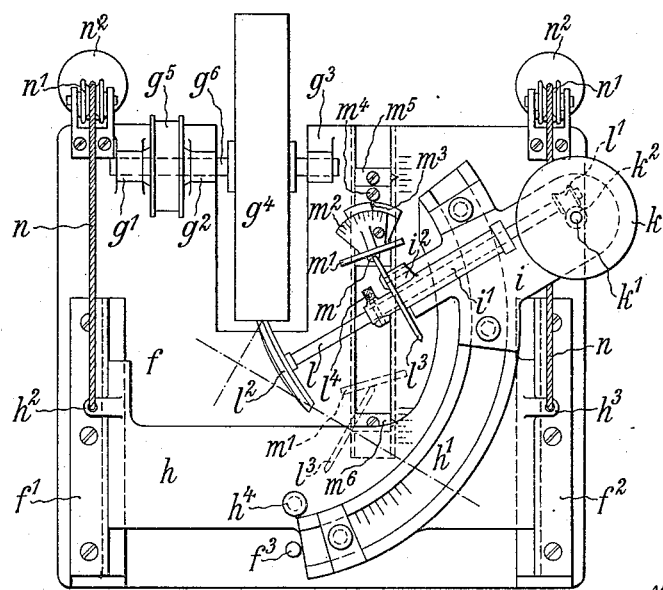

In the annexed drawing Fig. 1 is a diagrammatical view showing the principle of the new machine. In Fig. 2 a constructional example is shown in plan of a grinding machine according to the invention.

In the first instance the possibility of obtaining the desired result may be shown reference being had to Fig. 1 of the drawing. In the said figure $a$ is the shaft adapted to have a spectacle-glass $b$ fixed to it of a grinding machine fitted with a grindstone $c$ which is rotatable about an axis X—X, the said axis and the shaft $a$ being disposed in a plane which is alluded to in the following as the plane X, $a$. To the shaft $a$ there is fixed a cam $d$ which coacts with a stop $e$. The shaft $a$ with the spectacle-glass $b$ and the cam $d$ along with the stop $e$ are drawn in two different positions, of which only the one showing these parts in full lines is to be considered for the present. The axis X—X and the shaft $a$ contain in this position an angle $\alpha$, which inclination the rim surface to be ground will receive relatively to the axis of the spectacle-glass. The spectacle-glass is meniscal and has the shape of an ellipse. With the spectacle-glass in the position shown, a radius lying in the major axis of the said ellipse coincides with the straight line $b^1$, while, on the spectacle-glass being rotated, a radius lying in the minor axis would, on passing through the plane X, $a$, coincide with the straight line $b^2$. The relative distance of these two straight lines shall be termed the dip of the spectacle-glass. The cam $d$ is made plane and is bounded by an ellipsoidal curve having the same radial difference $\delta$ as the spectacle-glass. In order to grind the beveled rim surface on the elliptically shaped spectacle-glass, the distance between the grinding surface and the shaft $a$ must be varied, while the glass is being rotated, this being done in the present case by the shaft $a$ being moved relatively to the grindstone which retains its position, the shaft moving parallel to itself. The amount of this displacement must be limited by the stop and the cam in such a manner that at the end of the grinding operation, after a quarter revolution of the shaft $a$, the end of the straight line $b^2$ comes in contact with the grinding surface. Should the shaft $a$ be displaced in a direction containing with the shaft an angle of 90°, the cam would permit of a maximum displacement equal to the amount $\delta$, which displacement, however, as is obvious, would not be sufficient to bring the end of the straight line $B^2$ into contact with the grinding surface. If, furthermore, according to the proposal made above, the displacement be made in a direction forming with the shaft $a$ an angle differing from 90°, a direction, for instance, corresponding with that of the direction of the arrows shown in Fig. 1, the correct limit would still not be reached by the cam, if, as in the well-known machines, the stop $e$ were placed parallel to the line in which the plane X, $a$ cuts the grinding surface. If, however, the stop be inclined to this line, with a displacement effected in the manner described, an angle $\gamma^1$ may be found, for which with the cam in its forward position the correct limit will be obtained. If the stop be straight and be kept in the inclination given it for the correct limiting of the displacement of the shaft $a$ in the two positions under consideration of the spectacle-glass, in the intermediate positions the limiting is such that, on grinding a second similar rim surface on the glass, the angular edge of the latter, i. e. the intersecting line of the two beveled rim surfaces, lies on the surface of a cone, of which the straight line passing through the ends of the straight lines $b^1$ and $b^2$ forms a side line. In most cases that are likely to occur this conical surface will correspond with sufficient accuracy, in the part coming in question for the limiting of the spectacle-glass, with a surface such as would be required to contain the angular edge of the glass, e. g. with a spherical or a cylindrical surface. Should, however, in special cases the approximation of the conical surface to such a required surface be insufficient, in a limited degree the conical surface might be altered to another by a curving of the stop. It may be easily proved from Fig. 1 that for any given direction of displacement of the shaft $a$ and for any given size of the angle $\alpha$ the size of the angle $\gamma^1$ is only dependent on the size of the angle marked $\beta$, which the straight line joining the ends of the straight lines $b^1$ and $b^2$ forms with one of these two straight lines. Hence, for any given radial difference of the spectacle-glass, the angle $\gamma^1$ is only dependent on the dip of the spectacle-glass. With a certain direction of displacement of the shaft $a$ it is only necessary, when grinding a rim surface on glasses of similar shape but different dip, to alter in each case the angle $\gamma^1$ without a change of cam being required. As is also obvious, the same cam may be used not only for limiting the grinding operation on glasses of the same size as the cam, but for all such glasses as have the same radial difference.

When the second rim surface is to be ground with the grinding surface serving for the grinding of the first rim surface, after swinging the shaft $a$ from the position just described (shown in full lines) through an angle $2\alpha$ into a second position (shown in dotted lines), the stop must also be brought from its first position into a second one. The angle $\gamma^2$, which the stop in this second position must form with the line in which the plane X, $a$ and the grinding surface intersect one another, is for a given size of the angle $\alpha$ likewise only dependent on the angle $\beta$, but has in general another value than the angle $\gamma^1$. Hence, should a direction of displacement of the shaft $a$ be chosen, which forms with the said shaft an angle differing from 90° but for the rest having any value, on grinding the two beveled rim surfaces on a glass, the angle of inclination of the stop relatively to the line of intersection of the plane X, $a$ with the grinding surface would have to be set twice. This may, however, be avoided, by so choosing the direction of displacement for both positions of the shaft $a$, that the said direction is perpendicular to the line of intersection of the plane X, $a$ with the grinding surface, as then $\gamma^1 = \gamma^2$.

Should special importance be attached to not letting the direction of the stop approximate too closely to the direction of the cam even for large values of the angle $\beta$, which might interfere with the proper working of the stop, it is preferable to arrange for the displacement of the shaft $a$ holding the spectacle-glass relative to the grinding surface to take place in a direction which is parallel to the straight line connecting the ends of the straight lines $b^1$ and $b^2$, or in more general terms, to take place in a direction which is parallel to that straight line which connects those two points lying between the shaft for holding the spectacle-glass and the grinding surface of a plane containing the axis of the said shaft, through one of which, on the spectacle-glass being rotated, the end of a radius of the angular edge of the spectacle-glass, lying in the major axis and through the other of which a radius lying in the minor axis passes. The stop is then to be directed for a spectacle-glass of any dip parallel to the shaft holding such glass, and in this case, instead of a displacement of the stop, the guide in which the shaft $a$ is displaceable must be displaced correspondingly.

Instead of displacing, as in the case shown in Fig. 1, the shaft for holding the spectacle-glass during the grinding operation relatively to the grinding surface and the cam relatively to the stop, it is obviously possible to have the shaft in fixed journals and to displace relatively to it the grindstone and the cam. It may also be mentioned that, for instance, one of the plane side-surfaces of the grindstone might have been used as the grinding surface.

If a direction of displacement be chosen for the spectacle-glass or the grindstone, in which it is necessary, in accordance with the dip of the particular spectacle-glass to be ground, to rotate the stop about an axis perpendicular to the plane of motion of the said parts, it is preferable to let the axis of rotation of the stop pass through that point of the latter, in which the radius lying in the major axis of the cam contacts with the stop; for, since besides the possibility of rotating the stop also a possibility of displacing it perpendicularly or at least approximately so relatively to the grinding surface will be provided for, so as to be able to utilize one cam for spectacle-glasses of different size, it is possible, by means of such a disposition of the axis of rotation, to mark the scale along which the displacement of the stop is effected according to spectacle-glass sizes and to set by it independently of the rotation given to the stop.

The example shown in Fig. 2 of the drawing is a machine in which on a single grindstone first one of the beveled rim surfaces of a spectacle-glass and, after a corresponding swinging round of the shaft for holding the spectacle-glass, the second beveled surface is ground. To a horizontal base-plate $f$ three bearings $g^1$, $g^2$ and $g^3$ are fixed, in which a shaft $g^6$ carrying a grindstone $g^4$ and a belt pulley $g^5$ is rotatably journalled. There are further fixed to the base-plate $f$ two guides $f^1$ and $f^2$ for guiding a carriage $h$, the arrangement being such that said carriage can be slid between them perpendicularly to the axis of the grindstone. The carriage $h$ is fitted with a circular guide $h^1$, on which a body $i$ is displaceably disposed. The said body has fixed to it a bearing $i^1$ and is further provided with a bracket on which a small electric motor $k$ is disposed in such a manner that its shaft $k^1$ is vertical. The bearing $i^1$ carries a shaft $l$, to the end of which nearest the motor a worm-wheel $l^1$ is fixed, which worm-wheel engages a worm $k^2$ fitted to the shaft $k^1$ of the motor. To that end of the shaft $l$ which is remote from the motor a spectacle-glass $l^2$ is cemented. There is further fixed to the shaft $l$ a cam $l^3$ by means of a pin $l^4$ which is stuck through a hole in the nave of the cam and a corresponding hole in the shaft $l$ and is screwed to the said nave. The cam itself is also provided with a hole, and at the same distance as this hole is from the axis of the shaft $l$ there is provided in a projection $i^2$ of the bearing $i^1$ a threaded hole, so that the pin $l^4$ can be removed from the position it occupies in the drawing and be screwed, by sticking it through the hole provided for this purpose in the cam, to the bearing $i^1$. While with the pin $l^4$ in the position shown in the drawing the cam takes part in the rotation of the shaft $l$, it no longer does so with the pin in the other position. Opposite the cam and displaceable along a slot in the base-plate $f$ there is fitted, so as to be rotatable about an axis $m$, a stop $m^1$, the inclination of which relative to a line on the convex surface of the grindstone may be read off on a scale $m^2$ by means of an index $m^3$. In addition to the stop there are displaceably disposed in the slot in the base-plate two clamping pieces $m^5$ and $m^6$, which serve for limiting the displacement of the stop. By means of a clamping screw $m^4$ the stop can be fixed in the slot in the base-plate $f$. To either of two projections $h^2$ and $h^3$ of the carriage $h$ there is fixed a cord $n$, these cords passing over a pair of pulleys $n^1$, $n^1$ journalled at the back edge of the base-plate $f$ and carrying at their other ends, which hang down, the weights $n^2$, $n^2$. In order to be able to free the carriage from the action of the weights $n^2$ a hole $f^3$ is provided in the base-plate $f$, into which a spring actuated pin $h^4$, which can be displaced in the base-plate in a vertical direction, can snap when it is vertically above the hole $f^3$.

When the beveled rim surfaces are to be ground in the machine on a meniscal glass of non-circular shape, the carriage $h$ being first drawn back and fixed, a cam having the same radial difference as the spectacle-glass is fixed to the shaft $l$ and the spectacle-glass is cemented on. The stop $m^1$ is set in correspondence with the dip of the glass by the scale $m^2$ and the limiting bodies $m^5$ and $m^6$ are set corresponding with the size of the spectacle-glass by the scales provided along the slot in the base-plate, the stop being displaced in the slot till it contacts with the limiting body $m^5$. The body $i$ having been brought into a position on the guide $h^1$, in which the shaft $l$ has relative to the axis of the grindstone that inclination which the beveled rim surface is to receive relatively to the axis of the spectacle-glass, and which as a rule amounts to 30°, the carriage $h$ is released by withdrawing the screw $h^4$ and moves under the action of the weights $n^2$, $n^2$ towards the grindstone until the cam contacts on its entire circumference with the stop. If such contact takes place, the carriage $h$ having been withdrawn and fixed, the body $i$ with the shaft $l$ is brought on the guide $h^1$ into a position forming with the former one as a rule an angle of 60°. This being done, the stop $m^1$ is displaced in the slot, until it contacts with the limiting piece $m^6$ and is fixed there, the grinding operation being repeated as before.

When the rim surfaces are to be ground on a circular glass, the pin $l^4$ is removed from the position shown in the drawing and the cam screwed to the bearing $i^1$, so that, on the cam contacting with the stop $m^1$, the shaft $l$ always retains during a complete revolution the same distance from the grinding surface.

I claim:

1. In a machine for grinding beveled rim surfaces on spectacle-glasses a grindstone, a shaft rotatably disposed in a body and adapted to hold a spectacle-glass, guiding means allowing to displace during the grinding operation the grindstone and the shaft relatively to one another, these guiding means forming with the said shaft an angle which differs from 90°, and a cam coacting with a stop for limiting the relative displacement of the grindstone and the shaft, the angle contained by said stop and said guiding means being variable.

2. In a machine for grinding beveled rim surfaces on spectacle-glasses a grindstone, a shaft rotatably disposed in a body and adapted to hold a spectacle-glass, the said body being disposed so that the shaft may be swung from that position in which it lies, on one of the rim surfaces being ground, into a position in which by means of the grinding surface for grinding the first rim surface the second rim surface can be ground as well, guiding means allowing to displace during the grinding operation the grindstone and the shaft relatively to one another parallel to a straight line which lies in a plane containing the grindstone axis perpendicular to the line in which the said plane cuts the grinding surface, and a cam coacting with a stop for limiting the relative displacement of the grindstone and the shaft, the angle contained by said stop and said guiding means being variable.

3. In a machine for grinding beveled rim surfaces on spectacle-glasses a grindstone, a shaft rotatably disposed in a body and adapted to hold a spectacle-glass, guiding means allowing to displace during the grinding operation the grindstone and the shaft relatively to one another in a given case parallel to a straight line connecting those two points lying between the spectacle-glass and the grinding surface of a plane containing the axis of the said shaft, through one of which, on the said spectacle-glass being rotated, the end of a radius lying in the major axis and through the other of which the end of a radius lying in the minor axis of the spectacle-glass edge, in which the rim surfaces to be ground are to intersect one another, passes, and a cam coacting with a stop for limiting the relative displacement of the grindstone and the shaft, the angle contained by said stop and said guiding means being variable.

4. In a machine for grinding beveled rim surfaces on spectacle-glasses a grindstone, a shaft rotatably disposed in a body and adapted to hold a spectacle-glass, guiding means allowing to displace during the grinding operation the grindstone and the shaft relatively to one another, these guiding means forming with the said shaft an angle which differs from 90°, and a cam coacting with a stop for limiting the relative displacement of the grindstone and the shaft, the said stop being rotatable about an axis which is perpendicular to the plane of the said guiding means and passes through that point of the stop, in which it contacts with the radius lying in the major axis of the cam, and the angle contained by said stop and said guiding means being variable.

5. In a machine for grinding beveled rim surfaces on spectacle-glasses a grindstone, a shaft rotatably disposed in a body and adapted to hold a spectacle-glass, guiding means allowing to displace during the grinding operation the grindstone and the shaft relatively to one another, these guiding means forming with the said shaft an angle which differs from 90°, a cam coacting with a stop for limiting the relative displacement of the grindstone and the shaft, driving means releasably coupled with the said cam for rotating it about an axis parallel to the said shaft and means for fixing the cam relatively to the said body, the angle contained by said stop and the said guiding means being variable.

OTTO HENKER.